(12) United States Patent
Chidlovskii

(10) Patent No.: US 7,440,967 B2
(45) Date of Patent: Oct. 21, 2008

(54) SYSTEM AND METHOD FOR TRANSFORMING LEGACY DOCUMENTS INTO XML DOCUMENTS

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 517 days.

(21) Appl. No.: 10/986,490

(22) Filed: Nov. 10, 2004

(65) Prior Publication Data

US 2006/0101058 A1  May 11, 2006

(51) Int. Cl.
*G06F 7/00* (2006.01)
(52) U.S. Cl. ...................................................... 707/102
(58) Field of Classification Search ................... 707/102
See application file for complete search history.

(56) References Cited

U.S. PATENT DOCUMENTS

| | | | | |
|---|---|---|---|---|
| 5,560,006 | A | * | 9/1996 | Layden et al. .................. 707/2 |
| 6,675,353 | B1 | * | 1/2004 | Friedman ..................... 715/513 |
| 6,694,325 | B2 | * | 2/2004 | Jas .............................. 707/102 |
| 2003/0126556 | A1 | | 7/2003 | Soetarman et al. .......... 715/513 |
| 2003/0167445 | A1 | | 9/2003 | Su et al. ...................... 715/513 |
| 2003/0212698 | A1 | | 11/2003 | Mani et al. ................... 707/102 |
| 2004/0010754 | A1 | | 1/2004 | Jones .......................... 715/513 |
| 2004/0093331 | A1 | * | 5/2004 | Garner et al. .................. 707/3 |
| 2006/0167909 | A1 | * | 7/2006 | Mendis et al. ............... 707/101 |

OTHER PUBLICATIONS

U.S. Appl. No. 10/756,393, filed Jan. 14, 2004, Boris Chidlovskii, et al.

C. Baru, A. Gupta, B. Ludäescher, R. Marciano, Y. Papakonstantinou, and P. Velikhov, "XML-Based Information Mediation with MIX", ACM SIGMOD Proceedings, Philadelphia, PA, 1999, p. 1-5.

H. Do, S. Melnik, and E. Rahm, "Comparison of Schema Matching Evaluations", In Proceedings of the 2nd Int. Workshop on Web Databases (German Informatics Society), 2002, p. 1-15.

E. Rahm, P.A. Bernstein, "A survey of approaches to automatic schema matching", VLDB Journal 10:4 (2001), p. 334:350.

Stephen Soderland, "Learning Information Extraction Rules for Semi-structured and Free Text", Machine Learning, vol. 34, 1-3, 1999, p. 1-44.

(Continued)

*Primary Examiner*—Christian P. Chace
*Assistant Examiner*—Kellye Anderson
(74) *Attorney, Agent, or Firm*—Jeannette Walder

(57) ABSTRACT

A method for converting a legacy document into an XML document, includes decomposing the conversion process into a plurality of individual conversion tasks. A legacy document is decomposed into a plurality of document portions. A target XML schema including a plurality of schema components is provided. Local schema are generated from the target XML schema, wherein each local schema includes at least one of the schema components in the target XML schema. A plurality of conversion tasks is generated by associating a local schema and an applicable document portion, wherein each conversion task associates data from the applicable document portion with the applicable schema component in the local schema. For each conversion task, a conversion method is selected and the conversion method is performed on the applicable document portion and local schema. Finally, the results of all the individual conversion tasks are assembled into a target XML document.

15 Claims, 5 Drawing Sheets

OTHER PUBLICATIONS

Altamura, et al., "Transforming Paper Documents into XML Format with Wisdom++", Internet Citation [online] 2000, XP002317735, Retrieved from the Internet: URL:http://citeseer.ist.psu.edu/cac.PDF.

Chanod, et al., "From Legacy Documents to XML: A Conversion Framework", Research and Advanced Technology for Digital Libraries Lecture Notes in Computer Science; LNCS, Springer-Verlag, BE, vol. 3652, 2005, pp. 92-103, XP019018385, ISBN: 3-540-28767-1.

Chung, et al., "Reverse Engineering for Web Data: From Visual to Semantic Structures", Proceeding 18th, International Conference on Data Engineering. (ICDE '2002), San Jose, CA, Feb. 26-Mar. 1, 2002, ICDE, Los Alamitos, CA, IEEE Comp. Soc, US, vol. Conf. 18, Feb. 26, 2002, pp. 53-63, XP010588199, ISBN: 0-7695-1531-2.

Ishitani, Yasuto, "Document Transformation System from Papers to XML Data Based on Pivot XML Document Method", Document Analysis and recognition, 2003. Proceedings, Seventh International Conference on Aug. 3-6, 2003, Piscataway, NJ, USA, IEEE, Aug. 3, 2003, pp. 250-255, XP010656617, ISBN: 0-7695-1960-1.

Chidlovskii, Boris, "Schema Extraction for XML Data: A Grammatical Inference Approach", KRDB '01 Workshop (Knowledge Representation and Databases), [Online] Sep. 15, 2001, XP002442301, Rome, Italy, Retrieved from the Internet: URL:http://www.xrce.com/Publications/Attachments/2001-200/schemaExtr.pdf> [retrieved on Jul. 12, 2007].

Chidlovskii, et al., "Supervised Learning for the Legacy Document Conversion", ACM Symposium on Document Engineering, [Online] Oct. 28, 2004, Oct. 30, 2004 XP002442300, Milwaukee, Wisconcin, USA, Retrieved from the Internet: URL:http://doi.acm.org/10.1145/1030397.1030439> [retrieved on Jul. 12, 2007].

* cited by examiner

SYSTEM AND METHOD FOR TRANSFORMING LEGACY DOCUMENTS INTO XML DOCUMENTS

BACKGROUND

This disclosure relates generally to systems and methods for converting legacy documents into XML format.

Many companies and organizations that own data and documents in electronic form continually face a problem of migrating their legacy documents into new document formats that allow performance of operations in a most cost effective and efficient manner. This efficiency is obtained by sharing meta-information in the document. A standard formalism for encoding this meta-information and data exchange is extendable mark-up language (XML). The conversion process not only transforms legacy documents from an existing format into a new one, such as, for example, from Microsoft Word® into extended mark-up language, but also customizes information which is not explicitly encoded in legacy documents.

XML is the modern industry standard for data exchange across service and enterprise boundaries. It is becoming a significantly common practice to use XML as the underlying data model for information organization, exchange and reuse. A large spectrum of activities led by the Web Consortium, OASIS and others around XML, including XML schemata, XML querying and transformation, has led to an increasing availability of data and documents in XML format, the proliferation of domain-specific XML schema definitions using different schemata formalisms (Data Type Definitions (DTDs)), W3C XML Schemas, Relax NG), thus intensifying their exchange and increasing their reuse.

Migration to XML can be broken down into two important branches: data-oriented XML and document-oriented XML. Data-oriented XML refers to well-structured data and storage systems such as databases and transactional systems. Migration of this kind of data toward XML poses no serious problems, since data is already well-structured and ready for machine-oriented processing. However, problems associated with migrating documents toward XML are more serious and numerous. Documents of the type that often form corporate or group or personal knowledge bases, are unstructured or semi-structured, i.e., they are stored in generic or specialized file systems, in a multitude of formats and forms. The prevailing majority of documents are created for humans, with a number of implicit assumptions and choices which are easy for a human reader to select, process and evaluate, but difficult and ambiguous for computer programs to process efficiently. The migration of documents toward XML thus addresses the transformation of the documents into a form that facilitates machine-oriented processing and reuse of documents, while making all assumptions explicit and reducing the ambiguity of choices where possible.

Much work has been done in the field of automatic transformation of complex documents. For example, U.S. Pat. No. 7,165,216 filed Jan. 14, 2004, to B. Chidlovskii et al. for "Systems and Methods for Converting Legacy and Proprietary Documents into Extended Mark-Up Language Format" ("A3128-US-NP") treats the conversion as transforming ordered trees of one schema and/or model into ordered trees of another schema and/or model.

Transformation or conversion of legacy documents into XML documents may be seen as close to the wrapping of Web sources (since it addresses the migration of semi-structured Web documents into the global target schema). While wrapping copes with the extraction of (10 or fewer) elements from simple and regular Web pages and presenting them as plain tuples, conversion or transformation of other kinds of legacy documents in electronic formats must deal with hundreds of elements interrelated in a complex manner (guided by the target schema) and no unique method (including wrapper writing or induction) would work well.

SUMMARY

A method for converting a legacy document into an eXtended Markup Language (XML) document, according to one embodiment, includes decomposing the legacy document into a plurality of document portions; providing a target XML schema comprising a plurality of schema components for defining an output XML document; generating a plurality of local schema from the target XML schema, each local schema comprising at least one of the schema components; generating a plurality of conversion tasks by associating a local schema and an applicable document portion, wherein each conversion task associates data from the applicable document portion with the applicable schema component in the local schema; for each conversion task, selecting a conversion method and performing the conversion method; and assembling results from the conversion tasks and the target XML schema into the output XML document.

XML schemas define the structure, content and semantics of XML documents. An XML schema is a set of schema components. A schema component is the generic term for the building blocks that make up the abstract data model of the schema. Schemas describe what types of nodes may appear in documents and which hierarchical relationships such nodes may have. A schema is typically represented by an extended context-free grammar. A tree is an instance of this schema if it is a parse tree of that grammar. The purpose of a target XML schema is to define and describe a class of XML documents by using schema components to constrain and document the meaning, usage and relationships of their constituent parts: data types, elements and their content and attributes and their values. Schemas may also provide for the specification of additional document information, such as normalization and defaulting of attribute and element values. Schemas have facilities for self-documentation. Thus XML schema can be used to define, describe and catalogue XML vocabularies for classes of XML documents.

In this regard, it should be noted that an XML schema specifies constraints on the structures and types of elements in an XML document. The basic schema for XML is the DTD (Document Type Definition). Other XML schema definitions are also being developed, such as DCD (Document Content Definition), W3C XML Schema, etc. The main difference between DTD and DCD is that DTD uses a different syntax from XML, while DCD specifies an XML schema language in XML itself. W3C XML Schema is similar to DCD in this respect. In spite of the differences in the syntax, the goals and constraint semantics for all these XML schema languages are the same. Their commonality is that they all describe schema for XML documents. This means that they assume the common XML structure, and provide a description language to say how these elements are laid out and are related to each other.

To facilitate the conversion process, the legacy document may be first converted into a standard representation format, such as (X)HTML, prior to decomposing it into document portions. Many commercially available products are available for converting Word, PDF, etc. documents into (X)HTML. The method for converting a legacy document into an XML document may be thought of as including a global decomposition task T. The method may further include the step of decomposing the global decomposition task T into the plurality of conversion tasks $T_i$, i=1, ..., n and the step of validating the conversion tasks defined by $T_i$. For example, each conversion task $T_i$ is a pair $(D_i, S_i)$ where $D_i$ is the document portion associated with local schema $S_i$. Validating the plurality of conversion tasks $T_i$ includes determining if T is complete, wherein T is complete if all $T_i$ are data disjoint and schema independent, wherein $T_i$ is data disjoint if all $D_i$ and $D_j$ do not overlap and $T_i$ is schema independent if all $S_i$ and $S_j$ have no joint components.

Selecting a conversion method may include selecting a method from a library of methods including ad hoc converters, structure recognizers, machine learning methods and intra-document clustering methods.

A system for converting a legacy document into an XML document, according to another embodiment, includes a decomposer for decomposing the legacy document into a plurality of document portions; a memory storing a target XML schema for defining an output XML document, comprising a plurality of schema components, and storing a plurality of conversion methods; a local schema generator for generating a plurality of local schema from the target XML schema, each local schema comprising at least one of the schema components; a conversion task generator for generating a plurality of conversion tasks by associating a local schema and an applicable document portion, wherein each conversion task associates data from the applicable document portion with the applicable schema component in the local schema; a task processor, for each conversion task, for selecting a conversion method from memory and for performing the conversion method; and an assembler for assembling output from the task processor into the output XML document.

The system and method provides a general framework for decomposing complex XML transformations into smaller, easier to handle tasks (local transformations), and recombining the results. It also defines a simple declarative language for expressing the decomposition/assembly process. Because of the complexity of source legacy documents and target XML schema, the conversion can be achieved not by means of a unique method to the entire document, but by application of various methods and techniques to portions of the legacy document. The initial complex transformation/conversion problem is decomposed in a number of smaller sub-problems, where each sub-problem can be treated with one or a few appropriate methods from a library of available tools and techniques. A decomposition/assembly framework is provided. Then issues relevant to the document/schema management in the framework are addressed, in particular, script languages for defining the decomposition requests, the validity of decomposition, sub-problem definitions, the assembly of outputs into the valid target XML documents, etc.

BRIEF DESCRIPTION OF THE DRAWINGS

FIGS. 2 and 3 illustrate two exemplary source documents for conversion;

DETAILED DESCRIPTION

In the conventional setting of mass document migration toward XML, source documents are typically available either in proprietary, rendering-oriented format like PDF and PS (Microsoft Word, PowerPoint, Excel, etc. documents may be stored as PDF or PS documents), or their "save-as-HTML" versions. The results of a desired migration or transformation from the source documents are XML documents that should fit a user-defined or domain-oriented schema in the form of DTD, W3C XML Schema, etc. In the conversion setting, the target XML documents preserve all or an important part of document content of the source documents. In the following, we assume that all source legacy documents have first been converted to (X)HTML format for the sake of convenience. Most legacy documents can be easily converted to (X)HTML format due to the abundance of commercial (of-the-shelf) programs for performing this function. However, the XML structure of target documents may be very different from the source (X)HTML documents, these differences come from the opposite concepts of document creation, use and reuse: layout-oriented annotation of documents versus semantic-oriented.

Figure 1:
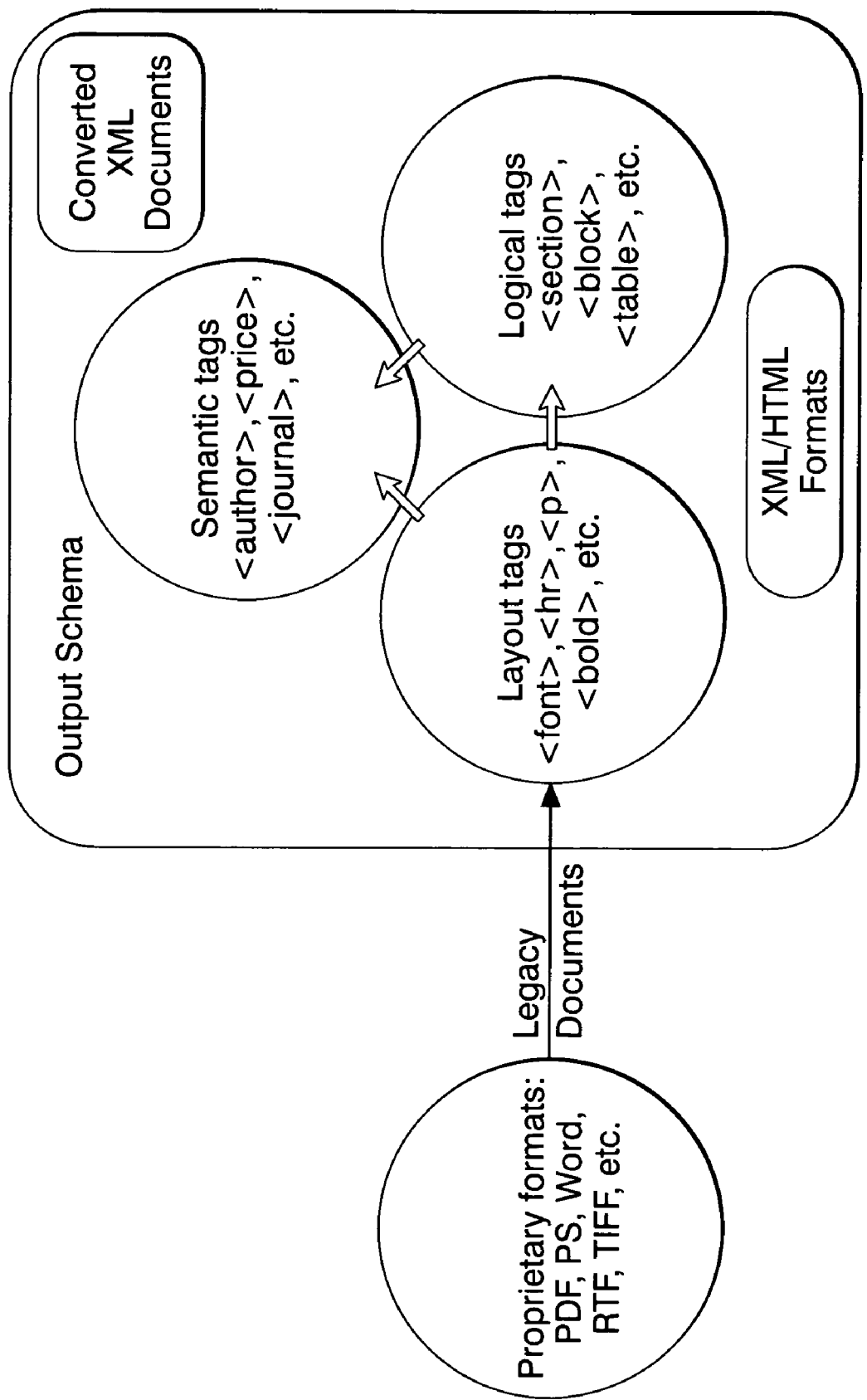
FIG. 1 is a schematic of legacy document conversion from layout-oriented to semantic-oriented annotation.

Referring to FIG. 1, a schematic of the basic conversion of legacy documents to XML documents is shown. Legacy documents include rendering- or layout-oriented documents, such as found in MS Word, PS, PDF, RTF, TIFF and (X)HTML. Legacy documents are popular because they are designed for ease of viewing and use by humans. XML documents represent a relatively new paradigm of semantic-oriented tagging of document content. The differences between the two may come up on all levels, including text segmentation, but overall, the differences can be found in tag vocabularies (where a tag is defined as an XML element name) and their relationships (grouping of content segments) given by corresponding XML schema constraints, etc.

An XML document is defined using a target XML schema. The target XML schema is the set of schema components used to define the metadata, layout and general structure of the output XML document. The target XML schema and the document "content" are used to generate the output XML document. Target DTD or W3C XML Schema definitions are complex objects, too; they include controlled vocabularies (element or tag names), terms and relationships between them. For example, NewsML, one of the most widely used Data Type Definitions used over the Internet, includes 119 elements and 37 entities. Other domain-specific DTDs (SportML and other DTDs from ICSR, DTDs from ebXML, DocBook, etc.) count 70 to 160 elements and 20 to 50 entities each.

Note that an XML schema is different from an XML Schema. The XML community distinguishes between an XML schema (small 's') which is a schema definition for XML documents (and their validation) in any of the existing schema languages (like DTD, DCD) and W3C XML Schema (capital 'S') which is one specific language for defining XML schema and validating XML documents. In the case of DTD, the schema is defined as a plurality of element (and entity) definitions. In the case of W3C XML Schema, a schema is a plurality of schema components, like simple and complex types, which in turn describe the elements, their attributes, content and relationship.

Figure 2:
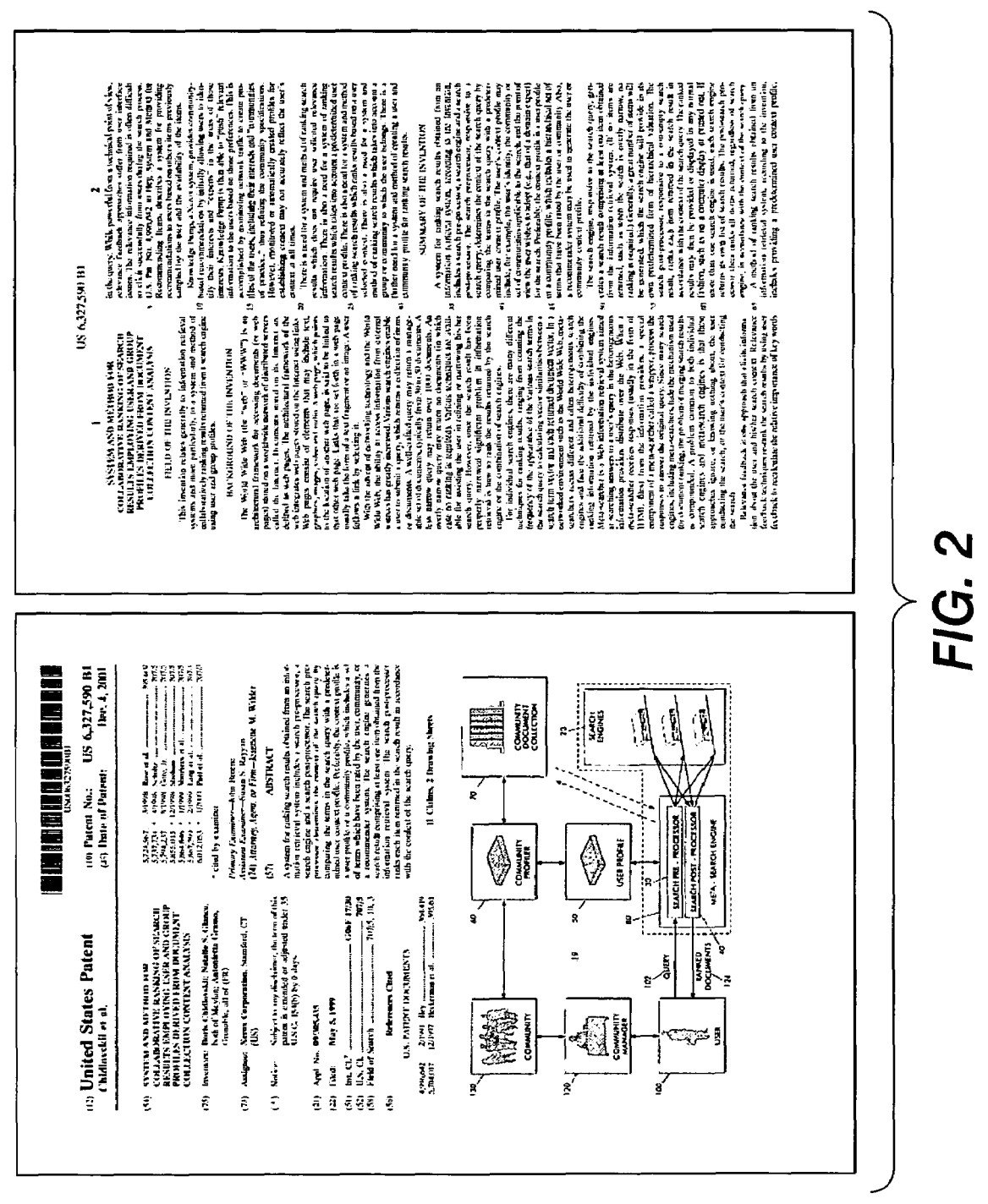
Figure 3:
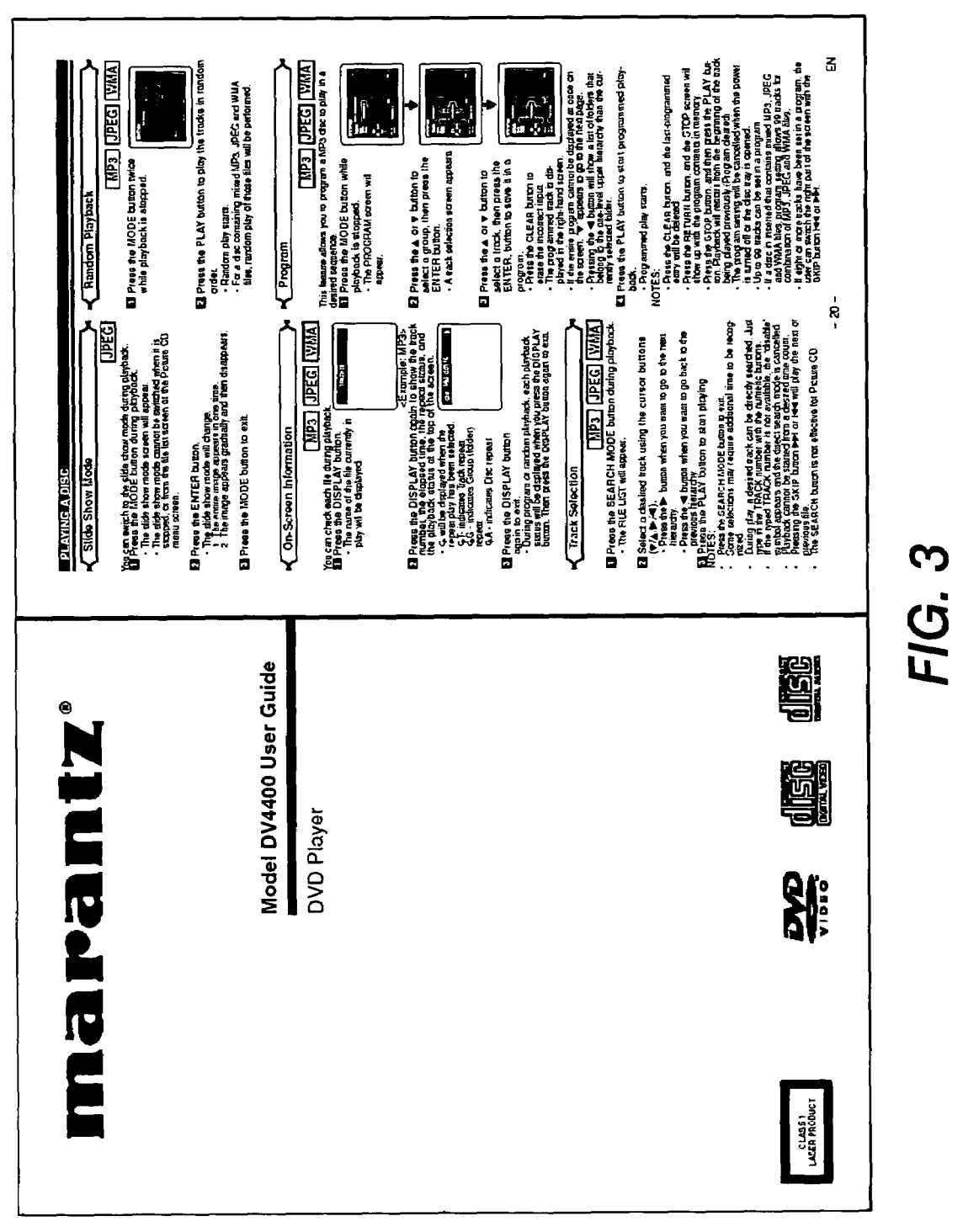

The complexity of source documents appears through a variety of components of different types, size and composition. Two examples of source documents shown in FIG. 2 illustrate the complexity of legacy documents. FIG. 2 shows two sample pages of a US patent, which is typically provided in PDF format. From FIG. 2, it can be seen that a patent has a complex structure, with a variety of issues to consider when transforming the PDF (or equivalent (X)HTML) into an XML document. The legacy document has rich metadata, including title, registration number, inventor names, affiliation, bibliography and many other fields. The logical structure of the legacy document includes the conventional entities like sections, paragraph and tables, as well as some special ones, like multi-level lists, math and chemical formulas, etc. FIG. 3 illustrates an example of technical document. This legacy document has few metadata fields (first page) but a large variety of different layout issues for structuring the text and image in the body of the document, including one-, two-, three-column pages, nested two-columns, etc. Certain elements of content (illustrated in FIG. 3 in bold) represent dictionary index entries.

Converting layout-oriented documents into semantic-oriented XML requires a large set of rules for rewriting layout instructions (for example, bold for index entities in the example above) into XML tags. XML and Web communities offer a set of tools for transforming data into and from XML, in particular, recommended by W3C transformation languages XSL, XSLT, XQuery, as well as their graphical extensions. However, using these tools for writing accurate transformations for mass document conversion appears difficult if even possible, because of the size and complexity of both source documents and target XML schema. There exist some alternatives to the manual writing of transformation rules. One of them may be based on machine learning techniques that can induce accurate transformation rules using a set of fully annotated source documents. Unfortunately, full annotation of source documents can be too expensive. Moreover, because of a large variety of different components in documents, no unique learning methods would be able to infer accurate transformation rules for all types of document components (for example, methods that work well on recognizing nested tables may do not work well on text entities, and vice versa).

Since high quality conversion requirements cannot be achieved by using one specific approach or method, the system and method disclosed herein manages this complexity by decomposing the conversion task into a set of smaller conversion tasks. In this way, different methods and techniques can be tested and then applied to the different individual conversion tasks. The individual methods can be chosen to best facilitate transformation of the individual conversion task and can vary from ad-hoc manual rules, to the automatic generation of conversion/transformation rules, to using methods of supervised and unsupervised machine learning, inner- and extra-document clustering, etc.

The decomposition principle allows the user to deploy all available techniques to achieve the conversion goal, where the initial complex conversion task is decomposed into a number of smaller and essentially easier-to-handle conversion sub-tasks, where each sub-task can be solved with an appropriate and often specialized method, such as bibliography extraction, list or table recognition and transformation, etc.

In the following, we describe a framework for a decomposition-based approach to the task of converting legacy documents to XML documents. The framework includes the following issues: Mechanism for defining the decomposition tasks; 2. Verification of the validity of the desired decomposition; 3. Creation of local schemas for the sub-problems that should produce the valid target fragments; and 4. Automation of the assembly of converted fragments into target XML documents.

Figure 4:
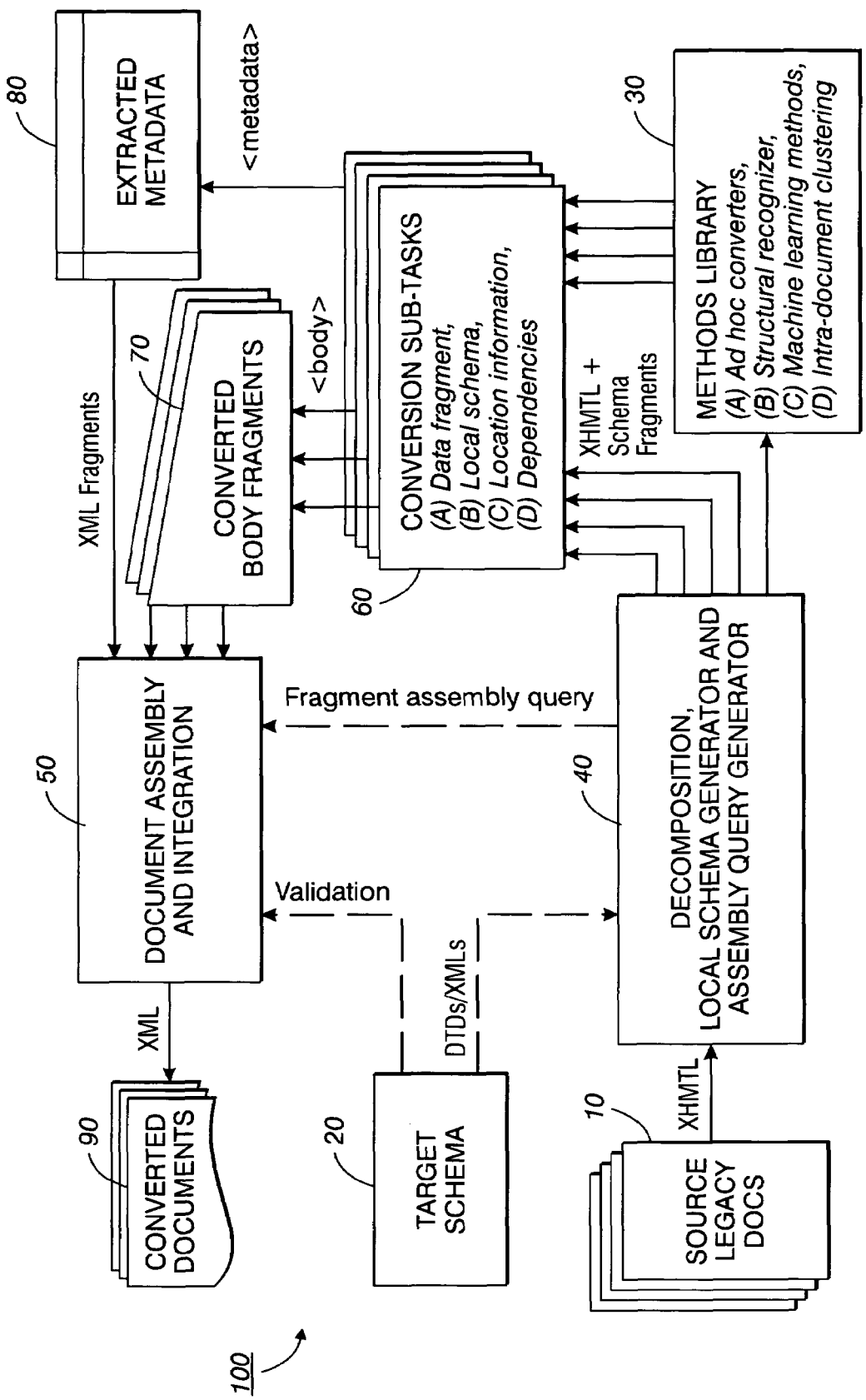
FIG. 4 is a block diagram of a system for converting legacy documents into XML documents.

Legacy Document Conversion: components and data flow. FIG. 4 is a block diagram of a system 100 for converting legacy documents into XML documents. In block 10, source legacy documents which are provided in their original format of PDF/PS/MSWord files are first transformed into standard formats such (X)HTML (using any of the commercially available PDF-to-HTML converters, such as pdf2html, CambridgeDoc, etc). The target schema (which is described in DTD, W3C XML Schema, Relax NG, etc.) which will be used to generate the output XML document is provide in block 20. A library of specific (ad hoc) converters, structure recognizer and machine learning methods is available in library 30 for deployment on specific portions of source data. The converters and methods can be prepared in advance or during the conversion contract.

After a source document is converted to (X)HTML, it is provided to block 40 for decomposition into document portions. The target schema is also provided to block 40 where it is input to a local schema generator. The local schema generator generates small schema using the individual schema components from the target schema. A decomposition request is composed using a high level script language and submitted to block 40. The request decomposes the initial conversion task into a set of individual tasks, where each task is defined on a certain source document portion and a corresponding local schema. The decomposition request can be created by a user or automatically by the system.

Each individual conversion task is tested with one or many converters, recognizers or methods from the library 30 in order to achieve the best accuracy of conversion for that document portion. Once the best method is selected, that method should produce XML fragments validated with the corresponding local schema. Once all conversion tasks have performed their conversions in conversion sub-tasks block 60, the converted body fragments in block 70 and extracted metadata in block 80 are provided to an document assembly and integration 50, where the target XML document 90 is recomposed from local fragments and metadata generated by the individual conversion tasks using the target schema.

Referring again to FIG. 1, XML target documents generally include three main groups of annotation elements which may be used during the conversion scenarios, namely: semantic annotations, logical annotations and layout annotations. Semantic annotations include metadata, which are content fragments/fields that concern the entire document. Metadata have historically been addressed by document annotation; it conventionally includes title/author/date/bibliography/creationDate/etc. Semantic annotations also include entities, which are low-granularity textual elements, such as index entry points, company names, etc. Logical annotations include paragraphs, different types of lists, sections and subsections, images, formulas, multi-column tables, etc. Layout annotations include font, highlighting such as bold and italics, etc.

The conversion framework assumes that the library offers a number of alternative and complementary techniques to cope with different types of annotations. Beyond manual methods, adaptive methods of information extraction are often most beneficial for semantic annotations, both metadata and entities. On other side, the recognition of logical annotations works well when using generic and/or adaptive heuristics such as those found in A3128-US-NP.

Conversion management components. To enable the decomposition and assembly framework and manage various issues associated with the task definition and validation, consider the following components: (1) Decomposition language (allows expression of the decomposition request in a declarative form); (2) Validator for the decomposition query (allows validation of the correctness of the decomposition queries, that is, the tasks are well-defined and they together completely define the conversion toward the target schema); (3) Generator of local schemas (decomposes the main schema into a set of smaller schemas, where each schema is associated with a specific task); (4) Validator for local components (verifies that the XML annotation generated by tasks match corresponding local schemas, any standard validator can be used at this stage); (5) Generator of assembly queries (validates the correctness of transformed components before initiating the assembly; the assembly query can be in a conventional format, for example, XQuery or XSLT languages; and (6) Assembly engine (applies the assembly query to integrate the components into valid target XML documents; standard XQuery or XSLT engine can be used). The deployment of the assembly procedure is preceded by the validation of all components against corresponding local schemas.

Example. Assume that a PDF/HTML document is to be converted into XML. The target XML schema requires the annotation of document metadata (title, author, year, bibliography), the logical structure of the document (section and paragraphs) and domain-specific entities (such as gene names or company tickets in the body of the document). This structure of target documents is given by the following XML target schema written in DTD:

```
<ELEMENT document (title, author*, year, (biblioEntry)*, (section)+)>
<ELEMENT biblioEntry (bib-title, bib-author*, bib-year, source)>
<ELEMENT Section paragraph+>
<ELEMENT Paragraph (PCDATA|entity)*>
<ELEMENT bib-title (PCDATA|entity)*>
```

Elements title, author, year, bib-author, bib-year and source are all textual elements (PCDATA). The order of elements in the XML does not necessary follow that in (X)HTML; the bibliography occupies the last page in the (X)HTML document, but should be placed in target XML document before the body.

Assume a user wants to complete the conversion in four tasks using available methods and extractors from the conversion library. The specified conversion tasks are as follows:
1. Extraction of document metadata (title, author, year) from the first page;
2. Extraction of bibliographical entries from the last page;
3. Recognition of logical structure (sections and paragraphs) of the document body (pages 2 to N—1); and
4. Recognition of entities in the document body and titles of bibliographical entries (pages 2 to N).

Figure 5:
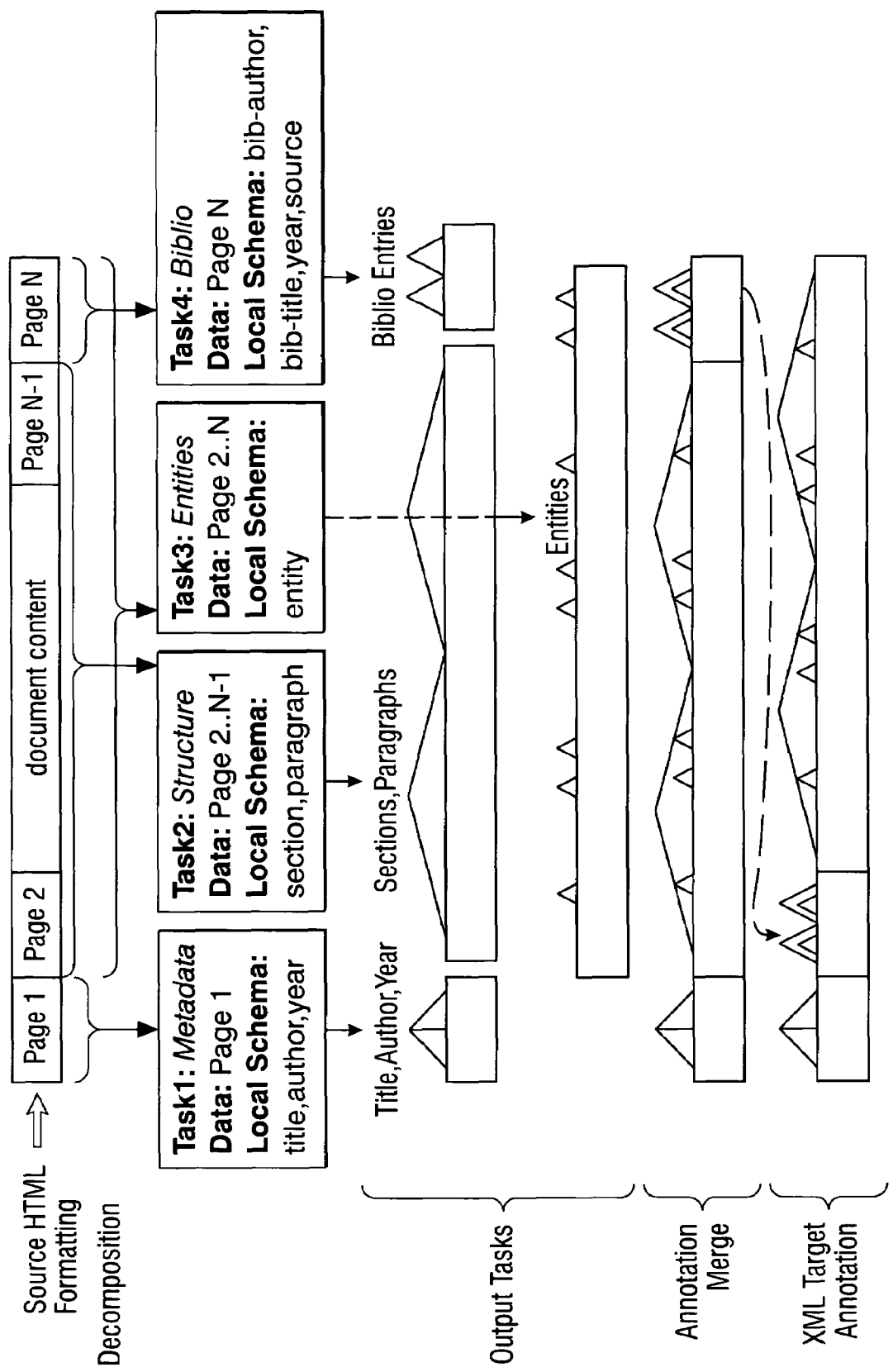
FIG. 5 is a diagram of an exemplary legacy document during the conversion process.

FIG. 5 illustrates the process of conversion by decomposition and assembly. Source (X)HTML document is decomposed into document portions: page 1, page 2, document content, pages N–1 and page N. The overall conversion task is decomposed into four individual conversion tasks. The defined four tasks are named Metadata, Structure, Entities and Biblio, with corresponding data fragments and local schemas assigned to each. Each task is defined by providing the data (fragment in the source document) and a local schema. The local schema for the Metadata task includes title, author and year (taken from the target XML schema). The local schema for the Structure task includes section and paragraph. The local schema for the Entities task include entity and the local schema for the Biblio task includes bib-author, bib-title. Year, source. Different tasks can use the same data (Structure and Entities in this example). Once the tasks are defined, methods from the library are applied to execute the corresponding conversions. Annotations brought by all tasks to the content in FIG. 5 are indicated as small-size trees referring to close-to-leaves annotations like entity, and large-size trees referring to high-level annotations, like section. The assembly of different annotations in a way to fit the target schema completes the conversion process.

The language support for the conversion decomposition and assembly consists of a set of high-level instructions which allows a user to create step-by-step the set of tasks, validate the decomposition they define, check out the results of conversions carried out by each tasks, and assemble the results into valid output. Alternatively, the decomposition request can be automated.

An exemplary list of instructions, include:
1. Source (<fileList>|<URI-Location>): defines the location of the source files, through the enumerating the file names, or through their directory (all files in the directory are considered for conversion);
2. Target <URI-Location> with <Schema-URI-Location>: defines the location of the target document as well as the target DTD schema;
3. Define <taskName>{Location} Where URI-Filter:: XPath With <elementList>{before|after <taskList>}: defines a new task, with task name, filter for the data segment and the list of elements for projection as the local schema. URI-Filter::XPath defines a two-step filter (fileFilter+Xpath expression) for the data segment. The optional clause before|after can additionally impose the order of task execution (if the task t1 should be executed after task t2, then all annotations set by t1 should respect annotations set by t2);
4. Validate <taskList>|"All": validates the decomposition defined by given (or by all) task definitions;
5. Decompose <taskList>|"All": applies the decomposition defined by task definitions;
6. Test <taskList>|"All": tests the result of conversion executed by tasks against the corresponding local schema; and
7. Assemble <TaskList>|"All": applies the assembly defined by corresponding task definitions.

The following sequence of steps exemplifies the decomposition/assembly process presented in the above Example. Steps 3 to 6 define four conversion tasks that represent the first part of the process. The second part is given by steps 7, 8, 10 and 11 that validate the decomposition, decompose the documents, and assemble the target documents from converted components.
1. Source 'file://home/conversion/example1/source'
2. Target 'file://home/conversion/example1/target' with 'file://home/conversion/example1/target.dtd'
3. Define Metadata 'task1' Where /html/body/page[position( )=1] With title, author, year
4. Define Structure 'task2' Where /html/body/page[position( )>1 and position( )<last( )] With section, paragraph
5. Define Biblio 'task4' Where /html/body/page[position( )=last( )] With bib-author, bib-title, year, source
6. Define Entity 'task3' Where /html/body/page[position( )>1] With entity after Structure, Biblio
7. Validate All
8. Decompose All
9. Step for testing/applying various library methods on four defined tasks
10. Test All
11. Assemble All Note that task Entities should be executed after tasks Structure and Biblio. This means that the task finds entities in the document content by preserving the boundaries of sections, paragraphs and biblio items determined by the two mentioned tasks. This avoids conflicts due to the overlapping annotations that can arise during the executed of the assembly procedure.

Schema management and validation. Decomposition T creates a set of conversion tasks, $T_1, T_2, \ldots, T_n$, where $T_i$ is a pair $(D_i, S_i)$, $D_i$ is a fragment of source documents D and $S_i$ is a local schema. Two tasks $T_i$ and $T_j$ are data-disjoint if $D_i$ and $D_j$ do not overlap; the two tasks are schema-disjoint if $S_i$ and $S_j$ have no joint (same) elements. Some schema-disjoint tasks are schema independent if elements of their local schemas are independent in the global target schema (no element includes another). The decomposition T is data-disjoint if all tasks it creates are data-disjoint. Similarly, T is schema-disjoint or schema-independent if all its tasks are schema-disjoint or schema-independent. A decomposition is complete if the defined tasks cover all elements in the target schema. In the Example, tasks 1, 2 and 4 are data-disjoint and schema independent; tasks 2 and 3 (as well as tasks 3 and 4) are data-dependent, schema-disjoint but not schema independent. These four tasks define a complete decomposition.

The generation of local schema for defined tasks can be performed in automatic manner, by the projection of the target schema on the element sets associated with the tasks. This works as follows. The user first defines all tasks with the help of Define instructions, specifying for each task all relevant elements in the "with" clause.

Using these task definitions, the system then automatically generates local schema, one local schemata for each task. This allows the system on the assembly step to control the output produced by local converters associated with the tasks (by validating their XML output against the local schema). The projection operation is straightforward for DTD schema definitions where each element has exactly one definition, so the projection can be achieved by selecting definitions for the given element set. For more complex formalisms, like W3C XML Schema or Relax NG that allow complex types for element, the projection can be achieved at the cost of certain schema generalization.

The assembly procedure is initiated when all the tasks have successfully implemented their local conversions. In certain cases, assembly can be validated statically, by observing only the declared document fragments and local schemas. It can be show that the static validation is possible for data-disjoint and schema-independent decompositions. However, the static validation is not feasible when source document fragments and local schema of the conversion tasks do overlap. In these cases, the assembly procedure is applied to the components and is successful if it terminates with the valid target XML.

Target schema S is order-preserving if the leaf order (in-depth left-to-right tree traversal) matches the order of the data in the source documents, that is, if any item A precedes an item B in target document iff it does so in the source document. Schema S is equivalent to order-matching, or order-safe if there exists a) such schema S' that S' is order-matching and b) a bi-jective mapping between target schema S and S'. The schema S in Example 1 is order-safe. For it, there exists schema S' with the top element defined as <ELEMENT document' (title, author*, year, (section)+, (biblioEntry)*)> that is, where sections precede the bibliographic entries. Schema S' is order-preserving and mapping between schemas S and S' is straightforward.

For order-safe schemas, all conversion steps, including the tasks execution and alignment are performed with respect to the equivalent schema S'. Once the alignment is archived, the S'-to-S mapping is used on the last step to transform the document from S' schema into final target schema S.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for converting a legacy document into an XML document, comprising:
    decomposing the legacy document into a plurality of document portions;
    providing a target XML schema comprising a plurality of schema components for defining an output XML document;
    generating a plurality of local schema from the target XML schema, each local schema comprising at least one of the schema components;
    generating a plurality of conversion tasks T by associating a local schema S and an applicable document portion D, wherein each conversion task associates data from the applicable document portion with a schema component in the local schema;
    validating the plurality of conversion tasks, wherein each conversion task $T_i$ in the plurality of conversion tasks T is a pair $(D_i, S_i)$ where $D_i$ is the applicable document portion associated with local schema $S_i$ and wherein validating the plurality of conversion tasks comprises determining if T is complete, wherein T is complete if all $T_i$ are data disjoint or schema independent, wherein $T_i$ is data disjoint if all $D_i$ and $D_j$ do not overlap and $T_i$ is schema independent if all $S_i$ and $S_j$ have no joint components;
    for each validated conversion task, selecting a conversion method and performing the conversion method; and
    assembling results from the conversion tasks and the target XML schema into the output XML document.

2. The method of claim 1, further comprising converting the legacy document into a standard representation format prior to decomposing it into document portions.

3. The method of claim 2, wherein the standard representation format comprises (X)HTML.

4. The method of claim 1, wherein the plurality of schema components comprise metadata components, logical components and layout components.

5. The method of claim 1, wherein selecting a conversion method comprises selecting a method from a library of methods including ad hot converters, structure recognizers, machine learning methods and intra-document clustering methods.

6. The method of claim 1, further comprising prior to assembling results from the plurality of conversion tasks into a target XML document, comprising:
    performing a plurality of sub-conversion tasks.

7. The method of claim 1, wherein generating a plurality of local schema from the target XML schema comprises automatically projecting the target XML schema on element sets defined in the conversion tasks.

8. The method of claim 1, wherein a legacy document comprises a rendering- or layout-oriented document.

9. A system for converting a legacy document into an XML document, comprising:
    a decomposer for decomposing the legacy document into a plurality of document portions;

a memory storing a target XML schema, comprising a plurality of schema components for defining an output XML document, and storing a plurality of conversion methods;

a local schema generator for generating a plurality of local schema from the target XML schema, each local schema comprising at least one of the schema components;

a conversion task generator for generating a plurality of conversion tasks T by associating a local schema S and an applicable document portion D, wherein each conversion task associates data from the applicable document portion with the applicable schema component in the local schema;

a validator for validating the plurality of conversion tasks, wherein each conversion task $T_i$ in the plurality of conversion task T is a pair $(D_i, S_i)$ where $D_i$ is the applicable document portion associated with local schema $S_i$ and wherein validating the plurality of conversion tasks comprises determining if T is complete, wherein the validator determines if T is complete, wherein T is complete if all $T_i$ are data disjoint or schema independent, wherein $T_i$ is data disjoint if all $D_i$ and $D_j$ do not overlap and $T_i$ is schema independent if all $S_i$ and $S_j$ have no joint components;

a task processor, for each conversion task, for selecting a conversion method from memory and for performing the conversion method; and an assembler for assembling output from the task processor into the output XML document.

10. The system of claim 9, further comprising a converter for converting the legacy document into a standard representation format prior to decomposing it into document portions.

11. The system of claim 10, wherein the standard representation format is (X)HTML.

12. The system of claim 9, wherein the plurality of schema components comprise metadata components, logical components and layout components.

13. The system of claim 9, wherein the memory stores a library of methods including ad hot converters, structure recognizers, machine learning methods and intra-document clustering methods.

14. The system of claim 9, wherein further comprising a processor for performing a plurality of sub-conversion tasks.

15. The system of claim 9, wherein a legacy document comprises a rendering- or layout-oriented document.

\* \* \* \* \*